Sept. 10, 1940.  H. C. BRIGGS  2,214,656
MECHANISM FOR IMPROVING THE DIRIGIBILITY
OF SHIPS, SUBMARINES, AND AIRCRAFT
Filed Jan. 20, 1938  4 Sheets-Sheet 1
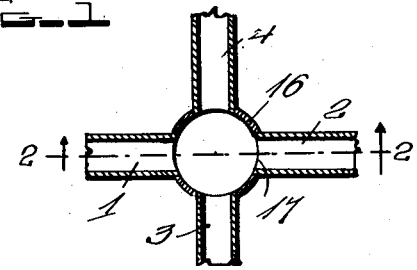
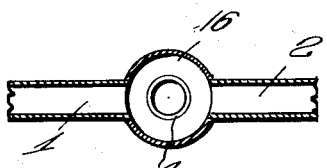
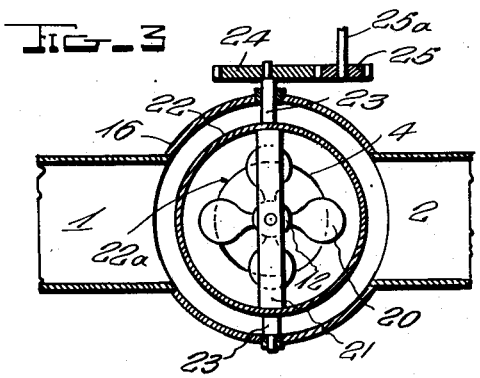
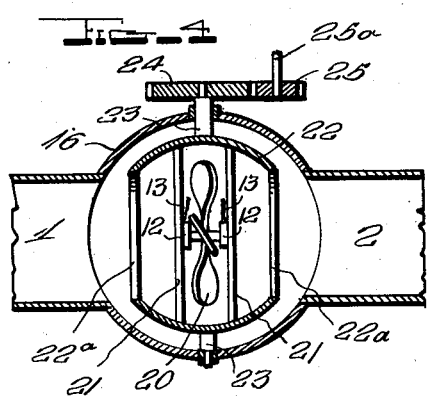
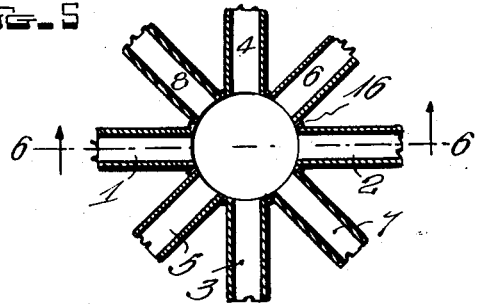
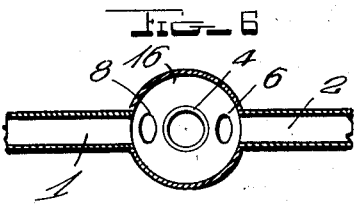
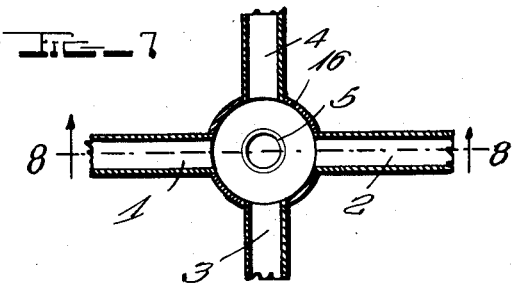
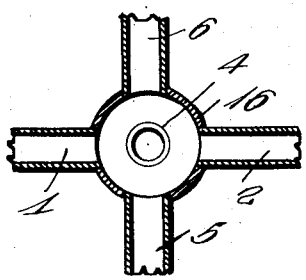
INVENTOR.
Henry C. Briggs,
BY
John B. Grady
ATTORNEY.

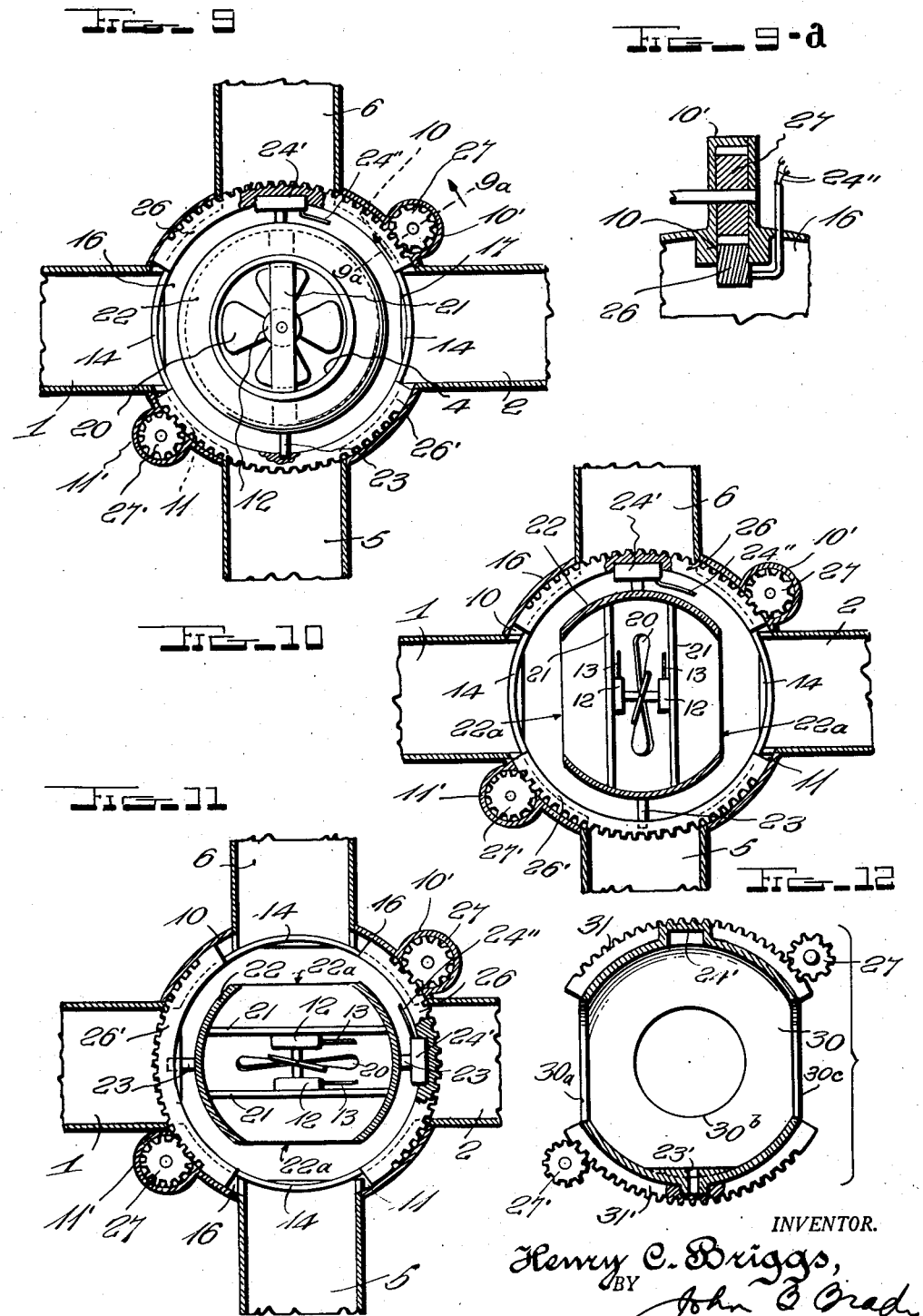

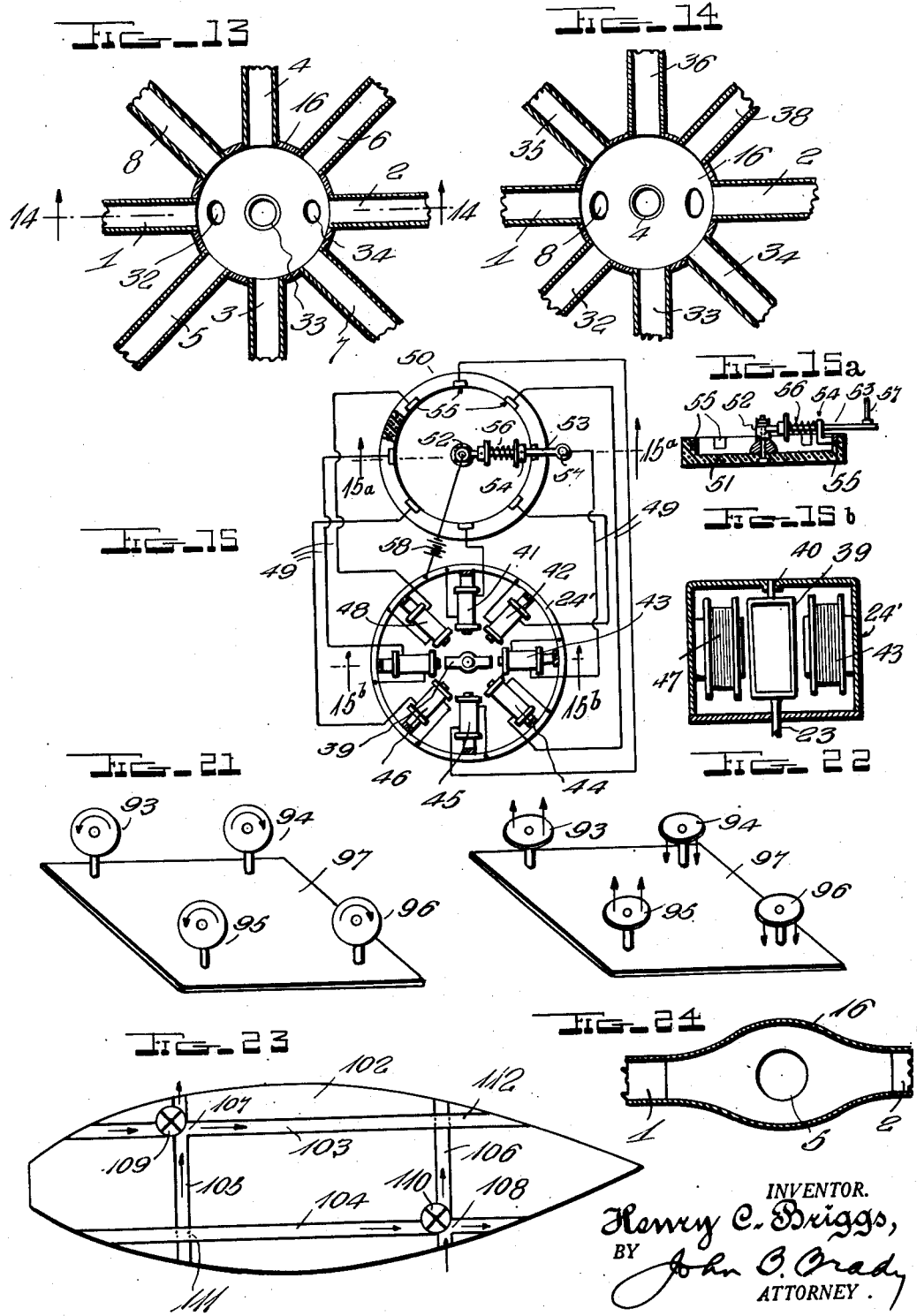

Sept. 10, 1940.  H. C. BRIGGS  2,214,656
MECHANISM FOR IMPROVING THE DIRIGIBILITY
OF SHIPS, SUBMARINES, AND AIRCRAFT
Filed Jan. 20, 1938   4 Sheets-Sheet 4
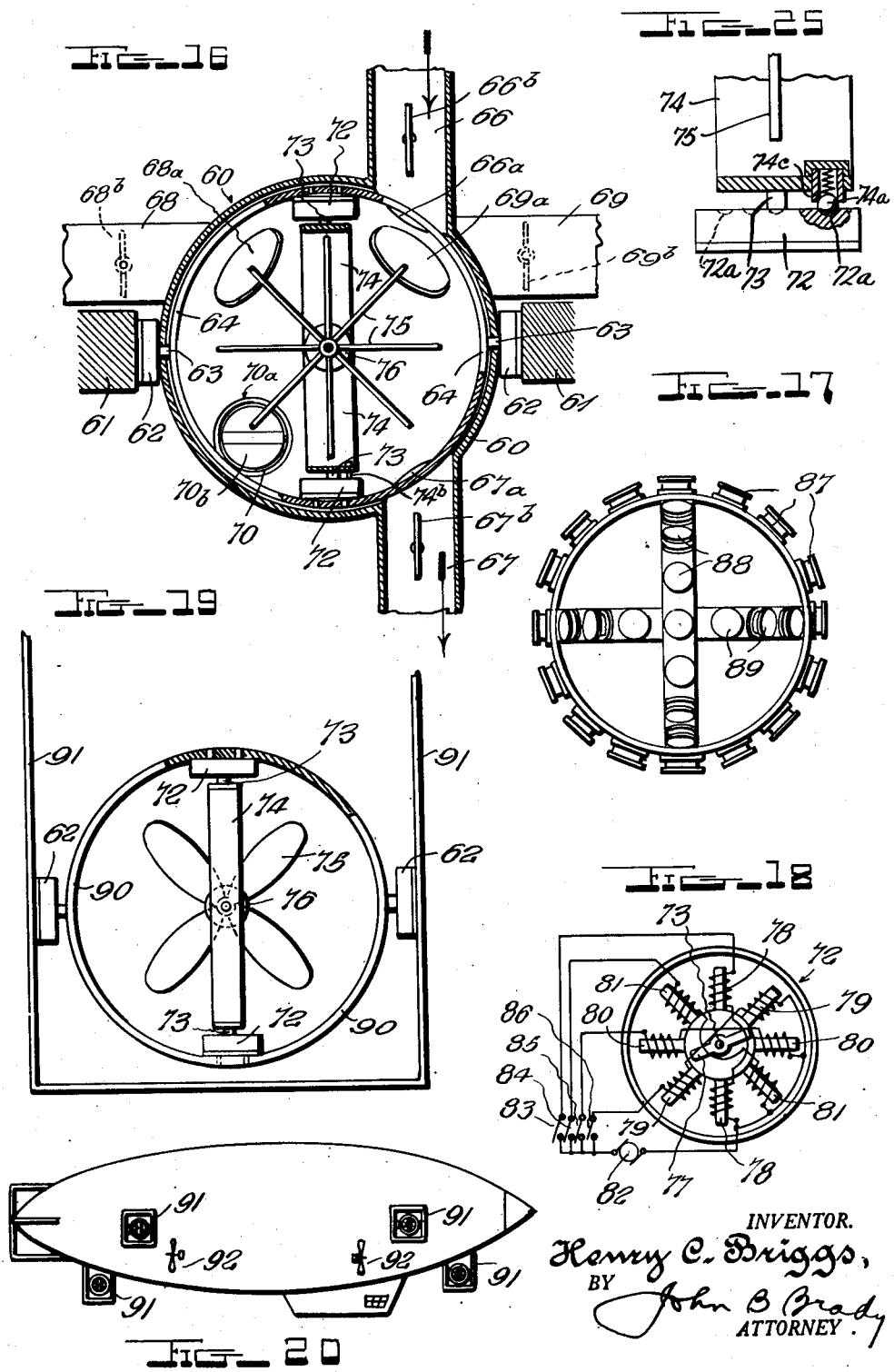

Patented Sept. 10, 1940

2,214,656

UNITED STATES PATENT OFFICE 2,214,656

MECHANISM FOR IMPROVING THE DIRIGIBILITY OF SHIPS, SUBMARINES, AND AIRCRAFT

Henry C. Briggs, Brooklyn, N. Y.

Application January 20, 1938, Serial No. 186,003

25 Claims. (Cl. 244—51)

My invention relates broadly to navigation of ships, submarines and aircraft and more particularly to safety mechanism for improving the dirigibility of ships, submarines, and aircraft and other vessels.

This application is a continuation-in-part of my copending application, Serial Number 105,112, filed October 10, 1936, for "Safety mechanism for improving the dirigibility of ships, submarines, and aircraft."

One of the objects of my invention is to provide an improved construction of navigation control mechanism by which steering of large vessels, submarine boats, and aircraft may be facilitated.

Another object of my invention is to provide a construction of orienting mechanism for an auxiliary propeller means or an impeller of a turbine, arranged for facilitating the navigation of vessels whereby the propeller means or turbine impeller, may be shifted to any desired operating plane for acting upon the fluid medium for developing the component of the forces necessary for the proper steering of the vessel.

Another object of my invention is to provide a selectively operated propulsion mechanism for ships, submarines and aircraft having means for orienting the propulsion mechanism in three-dimensional space for controlling the effective direction of propulsion thereof.

Still another object of my invention is to provide an arrangement of propulsion mechanism operative within a confined sphere shiftable to selected angular positions according to the direction of flow of the fluid medium which may be required for controlling the direction of movement of a navigable body in the fluid medium.

Another object of my invention is to provide an arrangement of directional ducts terminating in a confined body structure within which a turbine impeller or a propeller device may be mounted with means for controlling the plane of operation of the impeller or propeller from a position remote from the confined body.

A further object of my invention is to provide an arrangement of orienting mechanism for a turbine impeller or a propeller device disposed within a confined body structure having ducts extending in a multiplicity of directions with respect thereto and through which fluid media may be selectively forced.

A still further object of my invention is to provide an arrangement of coordinated propeller devices or turbine impellers grouped in such relation with respect to a vessel to be propelled that selective operation of any one or group of the turbine impellers or propeller devices may be utilized for maneuvering the vessel.

Other and further objects of my invention reside in the application of the orientation structure for propelling mechanism as applied to vessels, submarines and aircraft navigation as set forth more fully in the specification hereinafter following by reference to the accompanying drawings in which:

Figure 1 is a horizontal sectional view of a spherical housing with four ducts connected therewith for use in the system of my invention; Fig. 2 is a vertical sectional view taken on line 2—2 of Fig. 1, looking in the direction of the arrows; Fig. 3 is a central vertical longitudinal section through the center of the housing, illustrated in Figs. 1 and 2, showing a propeller mounted between appropriate uprights which are welded at their ends to the spherical framework, which in turn is pivoted to the spherical housing; Fig. 4 is a view similar to Fig. 3, but showing the propeller frame-work oriented so that the propeller is now operating through the ducts 1 and 2, as indicated; Fig. 5 is a horizontal sectional view showing an arrangement of eight ducts disposed in a circle in association with two-dimensional control; Fig. 6 is a vertical sectional view taken substantially on line 6—6 of Fig. 5 and showing more specifically the arrangement of the ducts which connect with the housing; Fig. 7 is a horizontal sectional view showing an arrangement of six ducts in connection with three-dimensional control; Fig. 8 is a vertical sectional view taken substantially on line 8—8 of Fig. 7; Fig. 9 is a longitudinal sectional view with parts shown in elevation for illustrating three-dimensional control of orientation with ducts 1 and 2 being arranged to the left and the right and ducts 5 and 6 running downwardly and upwardly, showing the propeller oriented for driving through ducts 3 and 4 (shown more particularly in Fig. 7); Fig. 9a is a detail section on line 9a—9a of Fig. 9; Fig. 10 is a similar view to Fig. 9 but showing the propeller oriented to turn its spherical frame-work so the orifices are now in line with ducts 1 and 2 whereas ducts 3, 4, 5 and 6 are closed and the propeller is driven through ducts 1 and 2; Fig. 11 is a similar view to Figs. 9 and 10 but showing the propeller oriented to drive through ducts 5 and 6; Fig. 12 is a diagrammatic section through the ring gear and associated parts used in Fig. 11; Fig. 13 shows a horizontal section through a spherical housing with fourteen ducts, in which eight ducts are horizontal and three ducts are arranged left and right across the top and bottom, it being understood that a propeller might be oriented in such a manner as to operate by the three-dimensional control previously described; Fig. 14 is a vertical sectional view taken on line 14—14 of Fig. 13; Fig. 15 is a schematic plan view showing means for controlling the orientation of the propeller from a remote position; Fig. 15a shows a transverse sectional view on line 15a—15a of the remote control means illustrated in Fig. 15; Fig. 15b is a transverse sectional view on line 15b—15b of the motor mechanism illustrated in Fig. 15; Fig. 16 is a vertical elevational view partially in section and illustrating one application of my invention to a structure adapted for improving the dirigibility of submarines and aircraft; Fig. 17 is an elevational view showing an arrangement of three belts each carrying a plurality of electromagnets which are designed to be energized in succession for positioning the propeller within the frame-work in a desired plane; Fig. 18 is a diagrammatic view showing an electromagnetic method for controlling the orientation of the propeller from a remote position; Fig. 19 is a side elevational view illustrating one method of suspending the orientation mechanism and the propeller on aircraft; Fig. 20 is an elevational view showing one application of the propulsion mechanism of my invention to dirigible balloons; Fig. 21 is a perspective view on reduced scale showing schematically, four orienting propellers mounted on aircraft and disposed so that the orienting propellers operate in a vertical plane; Fig. 22 is a similar view to Fig. 21 but showing four orienting propellers operating in a horizontal position causing the craft to rise, lower or tilt, a pair of each of these propellers being caused to operate in a direction opposed to each other; Fig. 23 is a plan view which represents the system of my invention arranged on a vessel with orienting turbines and with two-dimensional control of the impellers; Fig. 24 is a fragmentary sectional view showing an extension of the spherical housing at the left and right sides to meet the corresponding ducts at the point of junction, all of the ducts being similarly arranged in a streamlined fashion, thus facilitating flow of the driving medium; and Fig. 25 is a fragmentary sectional view showing one method of locking the orienting mechanism in a selected position to which the mechanism may be moved.

My invention provides means for navigating ships, submarines, aircraft, and other vessels with a high degree of precision and flexibility. I provide an arrangement of remote control mechanism by which propeller devices or turbine impellers may be selectively oriented in planes which may be coordinated for developing components of forces in fluid media for maneuvering a vessel therein. I may locate the turbine impeller or the propeller device within a confined body having ducts for the passage of fluid media extending in a multiplicity of directions whereby fluid media may be forced in a selected direction for navigating the ship, submarine, aircraft, and other vessel to which the system of my invention is applied. My invention may be applied in various forms and without intending to limit the scope of my invention, I have set forth various embodiments and applications of my invention in the specification hereafter following. I desire that it be understood, however, that the embodiments and applications of my invention as set forth herein, are to be considered only in the illustrative sense and not in the limiting sense.

Referring to the drawings in detail, I have shown schematically in Fig. 1, a horizontal sectional view illustrating a confined body or spherical housing 16 with four ducts connected therewith and opening into the housing. The duct 1 extends to the left; the duct 2 extends to the right; the duct 3 extends in one direction on an axis at an angle to the axis of ducts 1 and 2 and the duct 4 extends in the opposite direction with respect to the direction of duct 3. The junction of duct 2 with the spherical housing 16 is indicated at 17. In Fig. 2 showing a vertical section on line 2—2 of Fig. 1, the duct 4 has been illustrated as extending away from the spherical housing 16.

In Fig. 3 I have shown one manner of mounting the propeller means within the spherical housing 16. The propeller is indicated at 20, disposed in position between uprights 21, which may be welded at their ends to the spherical framework 22 which is journaled as indicated at 23 within the spherical housing 16. One or both of the journals 23 extends through the spherical housing 16 to the orientation control mechanism external to the spherical housing 16. For purposes of illustrating my invention, I have represented the orientation control mechanism as a gear 24 which meshes with the driving gear 25, which is driven through shaft 25a operated from a remote control position. The control means may connect directly with the journal 23 and various forms of control means may be employed. In Fig. 3, I have illustrated the propeller 20 operating through duct 4 and duct 3.

Fig. 4 illustrates the position of the propeller device when the propeller device is oriented so that the propeller 20 operates through ducts 1 and 2. In the oriented position illustrated in Fig. 4, the fluid medium is forced through the passage provided through ducts 1 and 2 and through the apertures 22a in spherical frame-work 22. The uprights 21 which support propeller 20, are relatively narrow as illustrated in Fig. 3 and offer a minimum of obstruction of flow to the fluid medium through the ducts 1 and 2. The uprights 21 serve as supports for the electric motors shown encased at 12 and which drive the propeller 20. Electrical connections are provided to electric motors 12 through flexible conduits 13 which lead through the spherical housing 16 and are provided with sufficient flexibility and length to permit passage through the spherical housing 16 without offering any obstruction to the operation of the orientation mechanism.

In Figs. 1–4, I have described a two-dimensional control system and in Figs. 5 and 6 I have illustrated an arrangement of the spherical housing 16 in which the number of ducts has been doubled for increasing the precision of operation of the two-dimensional control system. Fig. 5, which is a horizontal sectional view, shows ducts 1, 2, 3, 4, 5, 6, 7, 8 diametrically aligned with each other on opposite sides of spherical housing 16. Fig. 6, which is a vertical sectional view on line 6—6 of Fig. 5, shows the manner in which the ducts 8, 4 and 6 terminate interiorly of spherical housing 16. The propeller mechanism in this arrangement can be oriented to drive through eight ducts.

Figs. 7 and 8 illustrate the arrangement of spherical housing 16 for operation in a three-dimensional control system. In addition to the ducts illustrated in Figs. 1 and 2, I provide ducts 5 and 6 as illustrated in Fig. 8, wherein duct 5 extends downwardly and duct 6 extends upwardly. In Fig. 7, which is a horizontal sectional view, the downwardly extending duct 5 is illustrated in full line. In Fig. 8, the upwardly and downwardly extending ducts are illustrated as disposed on a vertical axis passing centrally through the spherical housing 16.

The three-dimensional control mechanism for orienting the propeller device in the system of ducts illustrated in Figs. 7 and 8, is shown more particularly in Figs. 9, 9a, 10, 11 and 12.

Referring to Fig. 9, I have illustrated the propeller 20 oriented to drive through duct 3 and duct 4. The spherical housing 16 is illustrated as having diametrically disposed segmental grooves 10 and 11 which serve as guides for segmental shaped toothed racks 26 and 26' bound together for angular movement by narrow hoop like connecting members 14. The segmental toothed racks 26 and 26' are slidable in an annular path confined by the walls of the segmental grooves 10. The orientation control box 24' is recessed into the central portion of segmental rack 26. The driving motor within the orientation control box 24' is connected through flexible leads indicated at 24" in which sufficient play, flexibility or lost motion is allowed to permit the flexible conduit housing of wires 24" to run through the propeller frame-work, through a narrow slit in the spherical housing 16 just over or adjacent the groove along which the segmental gear 26 slides. In Fig. 9a, I have shown the flexible leads 24" extending outside of the spherical housing 16 to the remote control position. The conduit including conductors 24" is sufficiently flexible to readily permit the angular movement of the propeller mechanism necessary for orienting the propeller for operation through selected ducts. The segmental gears 26 and 26' operating in grooves 10 and 11, respectively, are controlled by gears 27 and 27', respectively. Gears 27 and 27' are journaled exteriorly of housing 16 and are controlled by means of a remote control flexible shaft or other means. The spherical housing and the grooves 10 and 11 therein are shaped at 11' and 10' to enclose the drive gears 27 and 27', respectively. The symmetrical arrangement of drive gears 27 and 27' meshing with segmental shaped racks 26 and 26' insure adjustment of the spherical frame-work 22 in the desired angular position for aligning the propeller 20 with the selected ducts. In the position illustrated in Fig. 9, ducts 1, 2, 5, and 6 are closed while ducts 3 and 4 are effective to form a path for fluid forced through ducts 3 and 4 by the propeller 20. The spherical frame-work 22 is journaled at 23 in the segmental shaped rack 26' at one end and the other end of the frame-work 22 is controlled by control box 24'. The mounting of the propeller 20 within the frame-work 22 is similar to the method of mounting illustrated in Figs. 3 and 4, that is, the electric drive motors 12 carried by supports 21 operate to drive propeller 20. Cables 13 complete an electrical circuit to the motors 12 and extend to the remote control position without obstructing the orientation of the propeller 20.

In Fig. 10 I have shown the position of propeller 20 oriented under control of the control box 24' so that the propeller may drive through ducts 1 and 2 while spherical frame-work 22 closes off ducts 3, 4, 5 and 6. Control box 24' is operated from the remote control position for shifting spherical frame-work 22 so that the orifices 22a thereof are aligned with ducts 1 and 2.

In Fig. 11 I have shown the position of the propeller 20 oriented to a horiozntal plane for driving through ducts 5 and 6 while closing ducts 1 and 2 and ducts 3 and 4. Gears 27 and 27' have been operated to turn segmental gears 26 and 26' to the position illustrated in Fig. 11.

In Fig. 12 I have shown a modified form of housing for the propeller mechanism which is provided with integrally connected segmental shaped racks. I have shown the housing at 30 substantially spherical in shape and with apertures extending through diametrically opposite surfaces thereof as indicated at 30a, 30b, 30c, etc. Segmental shaped racks 31 and 31' corresponding to segmental shaped racks 26 and 26' are directly connected with the exterior wall of spherical frame 30 and are engageable between pinions 27 and 27' for effecting angular displacement of the spherical frame-work under control of the remote control means. A recess 23' is provided in one wall of the spherical housing 30 extending into segmental shaped rack 31'. A recess 24''' is provided in the opposite wall of housing 30 extending into rack 31.

The structure illustrated in Fig. 12 is a mechanical equivalent of the structure shown in Figs. 9–11 but avoids the use of the diametrically extending hoop like members 14. It will be understood that the hoop like members 14 are very narrow and are stream-lined in cross section so that minimum obstruction is offered to the flow of fluid media. However, in the structure illustrated in Fig. 12, the spherical frame 30 is apertured in diametrically opposite walls as represented at 30a, 30b and 30c so that no obstruction whatever is offered to the flow of fluid media through the selected ducts. If the spherical housing 16 is provided with eight horizontal ducts, for example, the spherical form of the frame 30, illustrated in Fig. 12 will be provided with a corresponding number of orifices. However, the spherical frame 22 which supports the propeller mechanism will have but two orifices as indicated at 22a regardless of the number of ducts entering the housing 16. An orifice is provided in the intermediate spherical frame-work for exit of the wires 24", just under the slit in the spherical housing. This intermediate sphere, of course, will always be shifted around in only one direction which will be perfectly in line with the slit in the spherical housing.

In Fig. 13 I have shown a horizontal sectional view of a spherical housing 16 having fourteen ducts terminating in the housing, that is, eight horizontal ducts, 1, 2, 3, 4, 5, 6, 7, 8, and three ducts each arranged left and right across the top and bottom with respect to which the propeller device may be oriented and aligned to operate for three-dimensional control as hereinbefore described. The three ducts arranged across the top of the housing 16 are represented at 35, 36 and 38. The three ducts across the bottom are represented at 32, 33 and 34. Referring to Fig. 14 which is a vertical section taken on line 14—14 of Fig. 13 looking in the direction of the arrows, the manner in which eleven of the ducts terminate in the spherical housing 16 has been illustrated, it being understood that three additional ducts terminate in the opposite side of the spherical housing 16 as illustrated in Fig. 14. The orientation control mechanism operates within spherical housing 16 in a manner similar to the description of the mechanism set forth in connection with Figs. 1–12.

In Figs. 9, 10 and 11 I referred to the control box 24' as enclosing the orientation control mechanism as the equivalent of the gear drive 24 illustrated in Figs. 3 and 4. The electrical mechanism employed in the control box 24' may take a variety of forms. I have illustrated one example of the electrical mechanism in Figs. 15, 15a and 15b. Each control box 24' is provided with a casing within which the control mechanism is substantially sealed. The shaft or journal extending to the frame is indicated generally at 23 connected to armature member 39 suitably journaled as indicated at 40 within the control box within the magnetic control field of radially disposed electromagnets 41, 42, 43, 44, 45, 46, 47 and 48. The magnetic armature 39 is adapted to be angularly shifted step by step under control of the sets of radially arranged electromagnets disposed about the path of movement of the armature 39. The conductors from the orientation control box 24' are indicated at 49 as extending in a flexible cable from the orientation control box to the remote control device 50. The remote control device 50 is located at the navigating position wholly removed from submergence in water or the corrosive effects from salt water. The remote control device comprises an insulated support 51 on which is journaled at 52, the rotatable lever arm 53. The rotatable lever arm 53 carries spring pressed contact member 54 which sweeps over the sets of contacts 55 arranged on the support 51. The contact member 54 is continuously urged into contact with the radially disposed contacts 55 by means of spring 56 disposed about arm 53. The operating handle 57 may be manually grasped or otherwise operated and rotated for shifting contact 54 selectively to any one of the contacts 55. A source of potential 58 connects between a common terminal of each of the electromagnets 41, 42, 43, 44, 45, 46, 47 and 48. The opposite terminals of the respective electromagnets connect with a selected one of the contacts 55 in correspondingly successive order. According, the controller may be shifted step by step to produce a corresponding shift in movement of the shaft or journal 23 in the control box 24' and a corresponding change in orientation of the propeller mechanism. It will be understood that any number of forms of circuit controllers may be employed and that the specific construction illustrated herein is not material to my invention.

Fig. 16 illustrates a modified arrangement of the propulsion mechanism confined within a spherical housing 60 with which a multiplicity of oppositely directed ducts are connected. The propeller mechanism is supported by a suitable frame 61 which supports diametrically opposite orientation control boxes 62, which have their operating shafts 63 extending through the spherical housing 60 and connected to the member 64. Member 64 is so shaped and streamlined that it will offer minimum obstruction around the openings through the ducts to the flow of fluid media. Because of the necessary alignment and coaction of the member 64 with associated parts of the spherical casing 60, the member 64 is shaped as a ring of relatively narrow cross-section streamlined so as to offer minimum obstruction to the passage of the fluid medium through the spherical housing 60, as will hereinafter be described in more detail. Contiguous with spherical housing 60, I provide vertically and laterally extending conduits 66, 67, 68, 69 and 70, 71, respectively. The conduits terminate in the walls of the spherical housing 60. I have shown the connection between conduits 66, 67 and spherical housing 60 through orifices 66a and 67a, respectively. I have shown the connection between conduits 68, 69 and spherical housing 60 through orifices 68a and 69a, respectively. The connection between conduit 70 and spherical housing 60 is indicated at 70a. The connection of conduit 71 is not shown in the view illustrated in Fig. 16 as it is forward of the section. Thus three-directional vertical and horizontal paths for the ingress and egress of the fluid medium through the spherical housing 60 are provided. The intake and discharge of the fluid medium through the conduits 66, 67, 68, 69, 70 and 71 is regulated by valves 66b, 67b, 68b, 69b, and 70b, respectively.

Ring member 64 carries a pair of orientation control devices 72 in which journals 73 of frame carrier 74 are mounted. Propeller 75 having blades thereof suitably modified to meet the requirements in the undersea and aircraft devices, is driven by suitable motor means indicated at 76. It will be seen that a three-dimensional control of the ingress and egress of water or air is precisely controlled in the enclosing spherical housing 60.

The orientation control boxes 72 are similar to the control box 24' described in connection with Figs. 15, 15a and 15b and are more clearly shown in Fig. 18. Each orientation control box 72 includes a magnetic armature 77 extending laterally of the journal member 73. The magnetic armature 77 is free to be angularly shifted step by step under control of sets of radially arranged electromagnets which I have indicated at 78, 79, 80, and 81. The sets of radially disposed electromagnets are mounted around the path of movement of magnetic structure 77. The leads from each orientation control box extend from the control box through flexible conductors to the control position. In Fig. 18, I have represented the source of operating potential by reference character 82 common to all of the sets of electromagnets 78, 79, 80 and 81. The magnets are selected by means of circuit controllers 83, 84, 85 or 86. The circuit controllers may be progressively actuated at the control position for progressively stepping the frame carrier 74 into the desired position for operation of the propeller 75. Mechanical interlock devices may be employed for maintaining the carrier 74 in the selected position so that it is not essential to continually excite a selected electromagnetic control circuit. One such interlock device is shown in Fig. 25 wherein detent 74a is mounted in member 74b supported by carrier 74 and spring pressed by means of spring 74c to a position engaging a selected recess 72a in the top of orientation control box 72. The yieldability of spring 74c is such that carrier 74 may be readily shifted to another selected position in which detent 74a is engaged in any one of the peripheral row of recesses 72a in the top of the orientation control box 72. When it is desired to restore the carrier 74 to a normal position, the circuit controllers 83, 84, 85 and 86 may be closed in reverse order. Prior to effecting such reversal of movement of carrier 74, the mechanical interlock theretofore maintained in the position of carrier 74, is removed by remote control.

Where the mechanism of my invention is applied to naval vessels subject to the destruction of war, which vessels ordinarily have hulls provided with armor plate, I intend that whatever enclosure serves to house the turbine or propulsion mechanism and the fluid conduits be likewise provided with armor plate for the protection of the auxiliary maneuvering mechanism. Where valves are provided in the fluid conduits, as indicated in Fig. 16, the turbine or propulsion mechanism itself is further protected from damage by pressure transmitted through fluid in the fluid conduits. Ordinarily, however, the turbine or propulsion mechanism is sufficiently isolated from the main body of fluid, due to the relatively small size of opening and the length of the fluid conduit, so that the effects of percussion in the main body of fluid are minimized at the position of the turbine or propulsion mechanism.

In certain structures it is desirable to increase the accuracy of the process of adjustment of the positions of the propelling devices, and for this purpose I provide the arrangement illustrated in Fig. 17. This arrangement shown schematically in Fig. 17 consists of belts of electromagnets 87, 88 and 89 extending normal to one another which may be imbedded in the walls of a spherical housing such as housing 60 in Fig. 16 and extending substantially equatorially to assist if required in the orientation of the framework 64.

The succession of electromagnets 87, 88 and 89 being successively magnetized, pick up various parts of the framework such as framework 64 which consists of magnetic material, or various magnetic members attached to the framework, and draw it around in one direction or another. A single belt may be used or two belts instead of three in any case where it may be desired to employ this means as supplementary to the other means for orientation. Or this method of orientation might be employed as the sole means if desired. The electromagnets are disposed in substantially equaltorial arrangement where the electromagnets are connected through individual circuit leads to the control position. The successive electromagnets may be sequentially energized for controlling the position of the propulsion means. I provide independent belts of electromagnets illustrated at 87, 88 and 89. The belts of electromagnets are fixed in position in planes which intersect each other in positions substantially normal to each other. The circular belts of electromagnets may be imbedded in the outer spherical housing 60 but insulated therefrom in any suitable manner. Fig. 17 is intended to schematically show the arrangement of the successive electromagnets.

For aircraft operation as illustrated in Figs. 19 and 20, the ducts or conduits may be omitted and yet the same orientation selectively effected. The spherical housing, also, may be reduced to a narrow ring 90 surrounding and supporting the propeller framework 74.

In applying the principles of my invention for improving the dirigibility of aircraft, I may mount the propulsion mechanism on a frame structure 91, as illustrated in Fig. 19. The frame structure 91 is applied forward and aft of the dirigible balloon as represented in Fig. 20, for controlling the angle of elevation of the balloon as well as improving its dirigibility to left and right. Corresponding sets of maneuvering devices are mounted in frames 91 on opposite sides both forward and aft, at or near the upper portion of the car or cars as shown in Fig. 20. These additional maneuvering devices are located with respect to the balloon wholly out of the path of the main propellers 92 and serve to assist in maneuvering the balloon in the required position. Controls for each of the maneuvering devices are taken to the control position aboard the control car and by coordination of the operation of the several devices, the craft may be steered with a high degree of precision.

I have shown various methods of orientation of propellers, but do not wish to preclude any other practicable method of orientation. Nor do I wish to preclude any other practicable means of driving propellers than those to which I have referred.

Where I have mentioned orientation of framework or driving of propellers by electromagnetic means, I do not mean to preclude the use of mechanical or other means wherever practicable.

I may orient the framework 74 in any of the ways illustrated in my copending application Serial No. 105,112, filed October 10, 1936, where practicable or by other means, employing the means shown here as supplementary thereto if desired.

I have indicated the housing structure schematically but it will be understood that the housing structure may be formed in sections simplifying assembly and allowing access to the interior of the housing for repair and replacement.

By employing such devices with orienting propellers on an airship or aeroplane, they may instantaneously convert the aircraft into an autogyro in an emergency by quickly orienting the propellers into substantially horizontal planes whereby the propellers act upon the air to establish a lifting force for the airship or aeroplane, and provide gentle descent to the ground. In the case of an airship with a detachable car, having one of these devices at each corner of the car, a comparatively small amount of power (storage batteries or fuel) would keep these propellers at high speed for a short time until the car gently descended to the ground.

Fig. 21 shows schematically four orienting propeller devices 93, 94, 95 and 96, with two-dimensional control placed at the four corners of a car on aircraft indicated generally by plane surface 97. If the two propellers 94 and 96 drive to right, and propellers 93 and 95 drive to left, this will turn aircraft around short toward the left, and vice versa by reason of the integral effect of the propellers upon the air and the displacement of air through the propellers in the selected direction.

Fig. 22 shows the four propeller devices 93, 94, 95 and 96 oriented in position and operating in a horizontal plane with respect to the aircraft represented at 97. If propellers 94 and 96 drive downward and propellers 93 and 95 drive upward, this will tilt aircraft represented at 97 in an upward direction, and vice versa. If all four propeller devices drive downwardly, this will tend in an emergency to give gentle descent of the car to the ground.

With propellers under three-dimensional control, propellers may be used not only to improve maneuverability and as a safety device, but could also furnish supplementary driving power. By selectively coordinating the operation of the several propeller devices 93, 94, 95 and 96 by remote control, driving forces may be developed which will facilitate navigation of the craft.

Fig. 23 represents this system of my invention applied to a ship, vessel, or submarine 102 with two-dimensional control of the propeller devices 70 or of impellers of turbines. The vessel 102 is provided with independent longitudinally extending ducts 103 and 104. I provide two transversely extending ducts 105 and 106. Transverse duct 105 intersects with and connects with longitudinally extending duct 103 at 107. Transverse duct 106 intersects with and connects with duct 104 at 108. Duct 105 passes beneath duct 104 at 111. Duct 106 passes below duct 103 at 112. The turbine impellers or propeller devices 109 and 110 are located at these respective intersections.

It will be seen that various components of maneuvering forces are developed by driving through various combinations of the ducts. With both units of the device driving backward, this furnishes supplementary driving power.

With three-dimensional control, ducts are provided running vertically as well as longitudinally and transversely. This device placed on a submarine or aircraft at front or back or sides or bottom or top or amidships permits various components of maneuvering forces to be developed which is of great value in maneuvering the vessel. With two-dimensional control, the ducts might run in only two directions, and on aircraft the ducts may be rudimentary.

Fig. 24 represents a method for extending the spherical housing of the propeller device at the left and right sides to meet the corresponding ducts at points of junction. The spherical housing 16 of Figs. 7 and 8 is streamlined into connection with ducts 1 and 2 and symmetrically connected in streamlined manner with the duct indicated at 5 and the opposite duct which is not indicated because it is forward of the position in which the view is taken. The spherical housing is elongated on the near and far sides in a symmetrical manner to meet the ducts extending on the near and far sides at their points of junction.

In systems employing my invention and utilizing two or three dimensional control under water, there may be occasions in which it is not practical to completely pack the concentric sphere with respect to the surrounding casing to prevent leakage. This condition may be experienced, for example, in ship installations. Under these circumstances the installation of my invention may be made in a compartment in the vessel below the water line with the various valved conduits extending through the bulkheads of the compartment to the side walls of the spherical housing. By closing all of the valves in the conduits, the compartment may be opened for inspection or repair of the maneuvering structure without any leakage of consequence.

While I have described my invention in certain preferred embodiments, I desire that it be understood that modifications may be made and that no limitations upon my invention are intended other than may be imposed by the scope of the appended claims.

What I claim as new and desire to secure by Letters Patent of the United States is as follows:

1. Means for controlling the dirigibility of a mobile body in a fluid medium comprising a spherical casing, conduits connected with said casing and extending in a multiplicity of directions from said spherical casing and terminating in the fluid medium, a frame member mounted within said spherical casing, a propeller supported within said frame member, means for rotatably driving said propeller, means for orienting said frame member for moving said propeller to a selected position for operation in a selected plane for controlling the relative ingress and egress of the fluid medium through selected conduits while obstructing others of said conduits by said frame member and correspondingly controlling the path of movement of the mobile body in the fluid medium.

2. Means for controlling the dirigibility of a mobile body in a fluid medium comprising a spherical casing, conduits connected with said casing and extending in a multiplicity of directions from said spherical casing and terminating in the fluid medium, a frame member journaled within said spherical casing, a propeller mounted within said frame member and operative through said casing, means for rotatably driving said propeller, electromagnetic means carried by said frame member for selectively orienting said frame member to a position for effectively driving said propeller for operation in a selected plane for controlling the relative rate of flow of the fluid medium through selected conduits while obstructing others of said conduits by said frame member and correspondingly controlling the path of movement of the mobile body in the fluid medium.

3. Means for controlling the dirigibility of a mobile body in a fluid medium comprising a spherical casing, conduits connected with said casing and extending in a multiplicity of directions from said spherical casing and terminating in the fluid medium, a frame member substantially conforming with the contour of said spherical casing, a propeller mounted within said frame member, means for rotatably driving said propeller, means in opposite portions of said conduits for independently regulating the flow of fluid medium through the individual conduits, means for orienting said frame member for selectively positioning said propeller for operation in a selected plane for controlling the relative ingress and egress of the fluid medium through selected conduits while obstructing others of said conduits by said frame member and correspondingly controlling the path of movement of the mobile body in the fluid medium.

4. Means for controlling the dirigibility of a mobile body in a fluid medium comprising in combination a substantially spherical housing, aligned conduits terminating at diametrically opposite positions of said housing, a frame structure, a propeller mechanism supported by said frame structure, means for rotatably driving said propeller mechanism, and means for orienting the frame structure within said housing for aligning said propeller mechanism in a plane normal to the axis of selected conduits terminating in said housing while obstructing others of said conduits by said frame structure.

5. Means for controlling the dirigibility of a mobile body comprising in combination with a substantially spherical housing, fluid conveying conduits disposed on axes intersecting each other centrally of said housing and terminating in diametrically opposite walls of the housing, a frame mechanism disposed within said housing, means for selectively shifting said frame mechanism to various angular positions within said spherical housing, a propeller mechanism supported by said frame mechanism, means for orienting said propeller mechanism for selectively aligning the propeller mechanism on an axis passing through selected conduits while obstructing the flow of fluid through others of said fluid conveying conducts by said frame mechanism, and means for driving said propeller mechanism for forcing fluid through any one of the conduits.

6. Means for controlling the dirigibility of a mobile body in a fluid medium comprising in combination a substantially spherical housing, ducts aligned with each other and terminating in opposite peripheral walls of said housing, a frame mounted within said housing and substantially conforming with the interior contour of said spherical housing, propeller mechanism carried by said frame, electromagnetic means disposed within said housing for selectively orienting said frame for positioning said propeller mechanism in a position in which fluid medium may be forced through selected ducts while obstructing the flow of fluid medium through others of said ducts by said frame, and means in each of said ducts for controlling the flow of fluid medium therethrough.

7. Means for controlling the dirigibility of a mobile body in a fluid medium comprising in combination a substantially spherical housing, ducts aligned with each other and terminating in opposite peripheral walls of said housing, a frame mounted within said housing and substantially conforming with the interior contour of said spherical housing, a support for propeller mechanism carried by said frame, propeller mechanism carried by said support, electromagnetic means intermediate said frame and said support for selectively orienting said support for positioning said propeller mechanism in a position in which fluid medium may be forced through selected ducts while obstructing the flow of fluid medium through others of said ducts by said frame, and an angularly adjustable valve disposed in each of said ducts adjacent said spherical housing for regulating the rate of flow of the fluid medium through the ducts.

8. Means for controlling the dirigibility of a mobile body in a fluid medium comprising in combination a substantially spherical housing, a group of ducts aligned with each other and terminating in diametrically opposite peripheral walls of said housing, a substantially spherical rotatable member disposed within said housing and having orifices at opposite sides thereof alignable with selected ducts of the group of ducts terminating in said housing while substantially closing others of said ducts, a propeller device adjustably mounted in said member, means for driving said propeller, means for controlling the effective plane of operation of said propeller for driving fluid medium through selected ducts connected with said spherical housing through a three-dimensional range.

9. In combination with a vessel, ducts extending in a forward and backward direction and from left and right through the vessel, selected pairs of said ducts establishing intersecting connection, propelling devices each having orienting impellers disposed adjacent the positions of intersection of said pairs of ducts, means for driving said impellers, means substantially enclosing said propelling devices and open at opposite ends, means for orienting said last mentioned means and said propelling devices to drive fluid through selected ducts while substantially closing other ducts for developing components of forces for improving the maneuverability of the vessel.

10. In combination with a submarine, ducts running through the submarine in three general directions: first, parallel to ships axis, second, transversely, and third, vertically of the submarine, selected ducts establishing intersecting relationship, orientable frame members having oppositely disposed apertures selectively registrable with said ducts disposed adjacent the intersections of selected ducts, impellers disposed within said frame members, means for driving said impellers, means for orienting said frame members to drive water through the oppositely disposed apertures therein and through selected aligned ducts while substantially closing others of said ducts by said frame members for developing components of forces for improving the maneuverability of the submarine.

11. In a system for controlling the dirigibility of vessels, a substantially spherical housing, a multiplicity of ducts, streamlined connecting means between said ducts and said substantially spherical housing, propulsion means within said spherical housing including a substantially spherical frame having apertures at opposite sides thereof adapted to conform with openings through the ducts terminating in said spherical housing, a frame extending transversely of said substantially spherical frame, driving means carried by said transversely extending frame, a propeller journaled in said transversely extending frame and driven by said driving means, said propeller operating in a plane aligned with the opposite apertures in said substantially spherical frame, and means for remotely controlling the orientation of said substantially spherical frame with respect to paths extending through said ducts.

12. In a system for controlling the dirigibility of vessels, a substantially spherical housing, a multiplicity of ducts extending in a multiplicity of directions with respect to said substantially spherical housing, streamlined connections between said ducts and said substantially spherical housing, a substantially spherical frame member disposed within said housing and substantially conforming in contour to the contour of said spherical housing and having orifices in opposite sides thereof, means for orienting said frame member for selectively aligning the orifices therein with a selected pair of said ducts while blocking the path through others of said ducts, propulsion means, means within said frame member for supporting said propulsion means, and means for rotatably driving said propulsion means.

13. In a system for controlling the dirigibility of vessels, a substantially spherical housing, ducts extending in a multiplicity of directions and connected with said housing, a frame member disposed within said housing, toothed segmental members carried by said frame member, said substantially spherical housing having opposite walls thereof grooved to receive said toothed segmental members and allow slidable angular displacement thereof, means engaging said toothed segmental members for angularly adjusting said frame member within said substantially spherical housing, and propulsion means mounted within said frame member.

14. In a system for controlling the dirigibility of vessels, a substantially spherical housing, ducts extending in a multiplicity of directions and connected with said housing, a frame member disposed within said housing, toothed segmental members carried by said frame member, said substantially spherical housing having opposite walls thereof grooved to receive said toothed segmental members and allow slidable angular displacement thereof, means engaging said toothed segmental members for angularly adjusting said frame member within said substantially spherical housing, propulsion means mounted within said frame member, means for driving said propulsion means, and means for orienting said propulsion means with respect to said frame member.

15. In a system for controlling the dirigibility of vessels, a substantially spherical housing, ducts extending in a multiplicity of directions and connected with said housing, a substantially spherical frame substantially with the contour of said housing and having orifices in diametrically opposite sides thereof alignable with said ducts, a support within said frame, a propeller device journaled with respect to said support and operative in a plane normal to an axis passing centrally through the orifices in said frame, means for driving said propeller device, means for orienting said frame on an axis normal to the axis of rotation of said propeller device, and means external to said frame for orienting said frame for presenting said propeller device in selected angular planes with respect to said ducts while closing others of said ducts by the walls of said frame intermediate the orifices therein.

16. In a system for controlling the dirigibility of vessels, a substantially spherical housing, ducts extending in a multiplicity of directions and connected with said housing, a frame member disposed within said housing and substantially conforming to the contour of said substantially spherical housing, symmetrically arranged control members disposed in diametrically opposite positions with respect to said housing, segmental members carried by said frame member and engaged by said control members, said frame member being apertured in opposite sides with the apertured sides alignable with selected ducts, a support disposed concentrically within said frame member, a propeller device carried by said support, and means disposed within said substantially spherical housing and adjacent one of said segmental members and one side of said frame member for selectively orienting said support to a position for aligning said propeller device with selected ducts.

17. In a system for controlling the dirigibility of vessels, a substantially spherical housing, ducts extending in a multiplicity of directions and connected with said housing, a frame member disposed within said housing, pinions journaled in symmetrical positions in said housing, a support disposed concentrically within said housing, toothed segmental racks carried by said support and engageable by said pinions whereby said support may be angularly shifted with respect to said housing, a substantially spherical casing journaled with respect to said support and having orifices in diametrically opposite walls selectively alignable with the connections of said ducts with said housing, a propeller device mounted within said substantially spherical casing and operative in a plane substantially normal to the central axis of said spherical casing, and means disposed between said support and said spherical casing for selectively orienting said casing for aligning the propeller device therein with selected ducts.

18. In a system for controlling the dirigibility of vessels in combination with a body structure, a system of ducts terminating in a central housing, a frame member journaled within said housing and apertured at opposite sides to register with the openings through the ducts terminating in said central housing, means for orienting said frame member to selectively register the apertured sides thereof with the openings through the ducts, a propeller journaled within said frame structure for forcing fluid through the apertured sides of the frame structure and through the openings in said ducts, and drive means for rotating said propeller.

19. In combination with an aircraft, ducts extending in a forward and backward direction and transversely through the aircraft, selected pairs of said ducts establishing intersecting connection within the aircraft, propelling devices each having orientable impellers disposed at the intersection of said pairs of ducts, means for driving said impellers, means substantially enclosing said propelling devices, said means being open at opposite sides, means for orienting said last mentioned means and said propelling devices to drive air through selected ducts while substantially closing others of said ducts for developing components of forces for maneuvering the aircraft through the air.

20. In combination with an aircraft, ducts extending longitudinally and vertically through the aircraft, selected pairs of said ducts establishing intersecting connection within the aircraft, propelling devices each having orientable impellers disposed at the intersection of said pairs of ducts, means for driving said impellers, means substantially enclosing said propelling devices, said means being open at opposite sides, means for orienting said last mentioned means and said propelling devices to drive air through selected ducts while substantially closing others of said ducts for developing components of forces for maneuvering the aircraft through the air.

21. In combination with an aircraft, ducts extending transversely and vertically through the aircraft, selected pairs of said ducts establishing intersecting connection within the aircraft, propelling devices each having orientable impellers disposed at the intersection of said pairs of ducts, means for driving said impellers, means substantially enclosing said propelling devices, said means being open at opposite sides, means for orienting said last mentioned means and said propelling devices to drive air through selected ducts while substantially closing others of said ducts for developing components of forces for maneuvering the aircraft through the air.

22. In combination with an aircraft, ducts extending longitudinally, transversely and vertically through the aircraft, selected pairs of said ducts establishing intersecting connection within the aircraft, propelling devices each having orientable impellers disposed at the intersection of said pairs of ducts, means for driving said impellers, means substantially enclosing said propelling devices, said means being open at opposite sides, means for orienting said last mentioned means and said propelling devices to drive air through selected ducts while substantially closing others of said ducts for developing components of forces for maneuvering the aircraft through the air.

23. In combination with an aircraft, ducts extending in different angular directions through the aircraft, selected pairs of said ducts establishing intersecting connection within the aircraft, propelling devices each having orientable impellers disposed at the intersection of said pairs of ducts, means for driving said impellers, means substantially enclosing said propelling devices, said means being open at opposite sides, means for orienting said last mentioned means and said propelling devices to drive air through selected ducts while substantially closing others of said ducts for developing components of forces for maneuvering the aircraft through the air.

24. In combination with a submarine, ducts running through the submarine in two general directions: first, longitudinally with respect to the ship's axis, and second, vertically with respect to the ship's axis, selected ducts establishing intersecting connection, orientable frame members having oppositely disposed apertures selectively registrable with said ducts disposed adjacent the intersections of selected ducts, impellers disposed within said frame members, means for driving said impellers, means for orienting said frame members to drive water through the oppositely disposed apertures therein and through selected aligned ducts while substantially closing others of said ducts for developing components of forces for improving the maneuverability of the submarine.

25. In combination with a submarine, ducts running through the submarine in two general directions: first, transversely with respect to the ship's axis, and second, vertically with respect to the ship's axis, selected ducts establishing intersecting connection, orientable frame members having oppositely disposed apertures selectively registrable with said ducts disposed adjacent the intersections of selected ducts, impellers disposed within said frame members, means for driving said impellers, means for orienting said frame members to drive water through the oppositely disposed apertures therein and through selected aligned ducts while substantially closing others of said ducts for developing components of forces for improving the maneuverability of the submarine.

HENRY C. BRIGGS.